United States Patent [19]

Yair

[11] Patent Number: 5,787,194
[45] Date of Patent: Jul. 28, 1998

[54] SYSTEM AND METHOD FOR IMAGE PROCESSING USING SEGMENTATION OF IMAGES AND CLASSIFICATION AND MERGING OF IMAGE SEGMENTS USING A COST FUNCTION

[75] Inventor: Eyal Yair, Haifa, Israel

[73] Assignee: International Business Machines Corporation, Armonk, N.Y.

[21] Appl. No.: 775,422

[22] Filed: Dec. 31, 1996

Related U.S. Application Data

[63] Continuation of Ser. No. 336,160, Nov. 8, 1994, abandoned.
[51] Int. Cl.[6] .................... G06K 9/34; G06K 9/68; G06K 9/70
[52] U.S. Cl. ............... 382/173; 382/177; 382/178; 382/226
[58] Field of Search ..................... 382/177, 178, 382/171, 226, 292, 173

[56] References Cited

U.S. PATENT DOCUMENTS

| | | | |
|---|---|---|---|
| 4,791,679 | 12/1988 | Barski et al. | 382/269 |
| 5,040,229 | 8/1991 | Lee et al. | 382/178 |
| 5,048,097 | 9/1991 | Gaborski et al. | 328/178 |
| 5,251,268 | 10/1993 | Colley et al. | 382/159 |
| 5,263,120 | 11/1993 | Bickel | 395/11 |
| 5,321,768 | 6/1994 | Fenrich et al. | 382/178 |
| 5,583,949 | 12/1996 | Smith et al. | 382/203 |

OTHER PUBLICATIONS

S. Liang et al, "Efficient Algorithms for Segmentation and Recognition of Printed Characters In Document Processing", IEEE Pac Rim '93.

J. G. Choi et al, "A Korean Character Recognition System", Computer and Communication, New Delhi, Aug. 28–30, 1991, pp. 242–246.

S. Tsujimoto et al, "Major Components of a Complete Text Reading System", Proceedings of the IEEE, V. 80, #7, pp.1133–1149.

E. Yair et al, "The Boltzmann Perceptron Network: A Soft Classifier" Neural Networks, vol. 3, pp. 203–221, 198.

Primary Examiner—Andrew W. Johns
Assistant Examiner—Monica S. Davis

[57] ABSTRACT

Image processing apparatus for segmenting an input image into image portions each containing a single character, the apparatus comprising identification logic for identifying connected components in the input image; classification logic, including a neural network, for determining into which of a number of predefined classes a connected component falls, at least one of said classes indicating that the connected component is most likely to be a single character; merging logic and splitting logic for merging and splitting the connected components. The merging and splitting logic and the classification logic are arranged to operate so that the connected components are iteratively merged and/or split and the resulting split and/or merged connected components reclassified by the classification logic until an image segmentation is achieved which meets a predefined criterion.

15 Claims, 5 Drawing Sheets

SYSTEM AND METHOD FOR IMAGE PROCESSING USING SEGMENTATION OF IMAGES AND CLASSIFICATION AND MERGING OF IMAGE SEGMENTS USING A COST FUNCTION

This is a continuation of copending application Ser. No. 08/336,160 filed on Nov. 8, 1994.

The invention relates to improvements in the processing of images of written or printed characters, such as is involved in optical character recognition (OCR). More particularly, the invention is concerned with improved apparatus and methods for segmenting an input image into image portions containing single characters for subsequent storage or processing by an OCR apparatus.

In many applications of OCR, the text to be recognized is hand written or printed in some specified areas of a form called data fields, or simply fields. Even for numeric data, where characters should be distinct text entities, it is quite common that the characters are either broken into several parts or are connected. These two types of phenomena may arise, for instance, due to writing styles, low/high scanning intensities, low quality inputs such as from photocopies or FAX output, binarization of gray scale images or noise.

Applications where connected characters are a particular problem are: tax forms, banking forms (e.g. checks or Giro slips), credit card slips, postal envelopes (e.g. ZIP-codes), inventory reports and others. In these types of applications the data fields contain groups of characters, such as amounts, quantities or code numbers, that are written in a free writing style, where the characters are generally not restricted to boxes. However, even in applications where the fields are partitioned into boxes, one can always find examples where the boxes have been ignored and connected characters used.

Broken characters can be found in almost any application of OCR to handwritten script.

In practice, it is essential for any application of OCR to handwritten data in real-life situations to be able to handle both connected and broken characters in the same field of data.

Conventional segmentation methods for a cursive handwritten text are based on locating in the cursive string those parts that connect the characters (called ligatures), without utilizing a character recognizer, see e.g. E. Lecolinet, J. P. Crettez "A Grapheme-based Segmentation Technique for Cursive Script Recognition" *ICDAR*-91, "*1st Intl. Conf on Document Analysis and Recognition*", pp 740–748, October 1991. This method, while suitable for a cursive text, in which the characters tend to be connected through ligatures, is not suitable for connected numerals which are not connected via ligatures. It also faces difficulties segmenting broken and/or noisy images.

Other methods, such as described in F. Kimura and M. Shridhar, "Recognition of Connected Numeral Strings", *ICDAR*-91, "*1st Intl. Conf. on Document Analysis and Recognition*", pp 731–739, October 1991, attempt to split connected components via a linear boundary. Performance of such methods are limited and they can handle around 70% of the split cases only.

Methods that use feedback from OCR have also been suggested, such as described in O. Matam, et al "Reading Handwritten Digits, a Zip Code Recognition System", *Computer*, pp 59–62, July 1992, to locate the four linear boundaries in a zip code of five digits. These methods, however, tend to be tailored to a specific application e.g. where the overall number of characters in the field is known apriori. Also, they do not handle fields containing broken characters.

This invention is directed to problem of the reliable and robust segmentation of a field into its individual characters. The invention finds particular, though not exclusive, application to OCR applications such as tax forms, zip codes, census forms and credit card slips. In all these types of applications reliable and robust field segmentation is essential.

Accordingly, the invention provides image processing apparatus for segmenting an input image into image portions each containing a single character, the apparatus comprising identification logic for identifying connected components in the input image; classification logic for determining into which of a number of predefined classes a connected component falls, at least one of said classes indicating that the connected component is most likely to be a single character; merging logic and splitting logic for merging and splitting the connected components, the merging and splitting logic and the classification logic being arranged to operate so that the connected components are iteratively merged and/or split and the resulting split and/or merged connected components reclassified by the classification logic until an image segmentation is achieved which meets a predefined criterion.

Generally, an OCR input image may contain an arbitrary number of connected components, where each component could represent several characters joined together, a single character, a part of a character, a noise, or any other piece of image.

A solution to the segmentation problem is therefore provided at the field level rather than at the component level. In other words, all components of an input image are iteratively merged and split until an acceptable segmentation is achieved. This approach to field segmentation is generic and can handle connected, broken and noisy data appearing in the same field. It can take into account spatial relationship between the field components rather than just treating each component individually.

The classification logic dynamically reclassifies the merged and split connected components during the segmentation process. This dynamic reclassification is used to monitor both the global segmentation process and the local split and merge operations. The whole segmentation process is controlled and monitored by a classifier defined over the space of connected components with a set of classes that have meaningful segmental information for the splitting and merging modules.

The approach may be applied to a wide range of applications where character image segmentation is required.

Suitably, the classification logic comprises a neural network. The predefined criterion could be, for example, that all connected components are classified as most likely to be single characters or that a required number of single characters have been identified.

In a preferred embodiment the classification logic has a tree structure with partial classifiers at each node. This enables advantage to be taken of the fact that different sets of features of the images may be used to distinguish between different classes in order to improve the performance and efficiency of the classification logic.

Advantageously, the classification logic can comprise means to derive a feature vector from the connected components via a two-pass process in which features of a document image in which the image is located are used to normalize the feature values. In an application to fill in forms, for example, this feature enables features of the whole form to be used to normalize the features of the field being segmented. This reduces the sensitivity of the segmentation to features such as character width and height and line width, which may vary between, for instance, different handwriting styles and improves the robustness of the technique.

The splitting logic can be arranged to generate a tree structure by postulating a single split hypothesis for each connected component, the images generated by the split hypothesis being processed by the classification logic to accept or reject the split and if the split is accepted being added to the tree as children nodes and processed by the splitting logic in the same way until no further splitting is possible.

This tree structure split scheme has the advantage that the total number of characters in the split connected component need not be known a priori, and the order of the split can be determined dynamically.

The merging logic can be arranged to repeatedly generate a matrix of combining costs for each pair of connected components and to select therefrom a pair of connected components to be combined until a stopping criterion is satisfied.

In this way the merging can be carried out progressively, subject to a global field cost function which incorporates into the segmentation global consideration rather than only local ones. This improves the accuracy of the segmentation, especially for broken data.

The segmentation of the field can be carried out in conjunction with the OCR or the two processes can be carried out independently, in which case the segmentation process can be a preprocessor for the OCR module. The advantage of the latter approach is modularity. Any OCR module can be used once the field is already segmented.

Also provided therefore is an optical character recognition system for recognizing character images comprising broken and connected characters, comprising image processing apparatus of the above type and optical character recognition logic arranged to process the image portions.

Viewed from another aspect, the invention provides a method for segmenting an input image into image portions each containing a single character for subsequent storage or processing by OCR apparatus, the method comprising: identifying connected components in the input image; classifying the connected components by determining into which of a number of predefined classes a connected component falls, at least one of said classes indicating that the connected component is most likely to be a single character; and iteratively merging and splitting the connected components and reclassifying the resulting split and/or merged connected components until an image segmentation is achieved which meets a predefined criterion.

An embodiment of the invention will now be described, by way of example only, with reference to the accompanying drawings, wherein.

Figure 4:
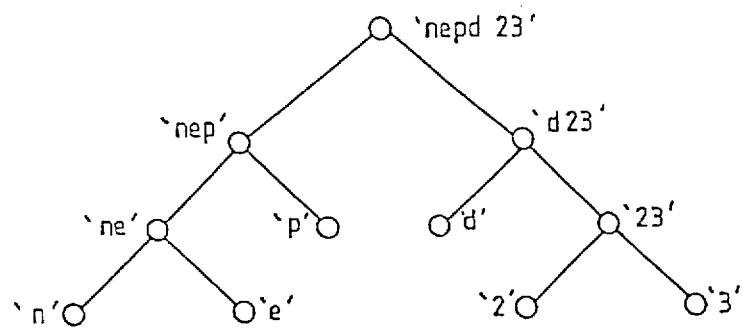
Figure 5:
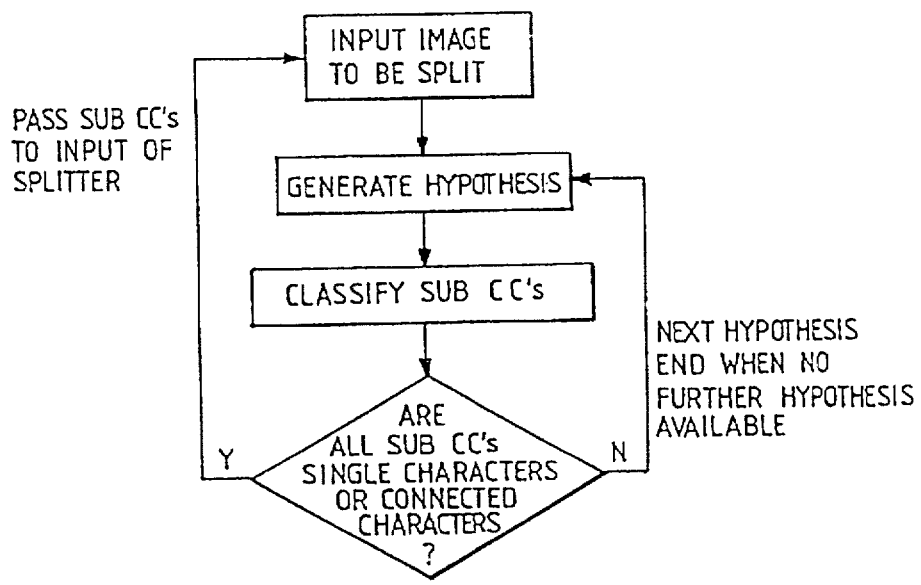

FIGS. 3(a)–3(g) illustrate the identification of the connected components in the input image;

FIG. 4 illustrates the tree structure of the classification logic;

FIG. 5 is a flow diagram showing the operation of the splitter;

FIGS. 6a–e are examples of field images; and

FIGS. 7a–e are examples of segmented images.

Figure 8:
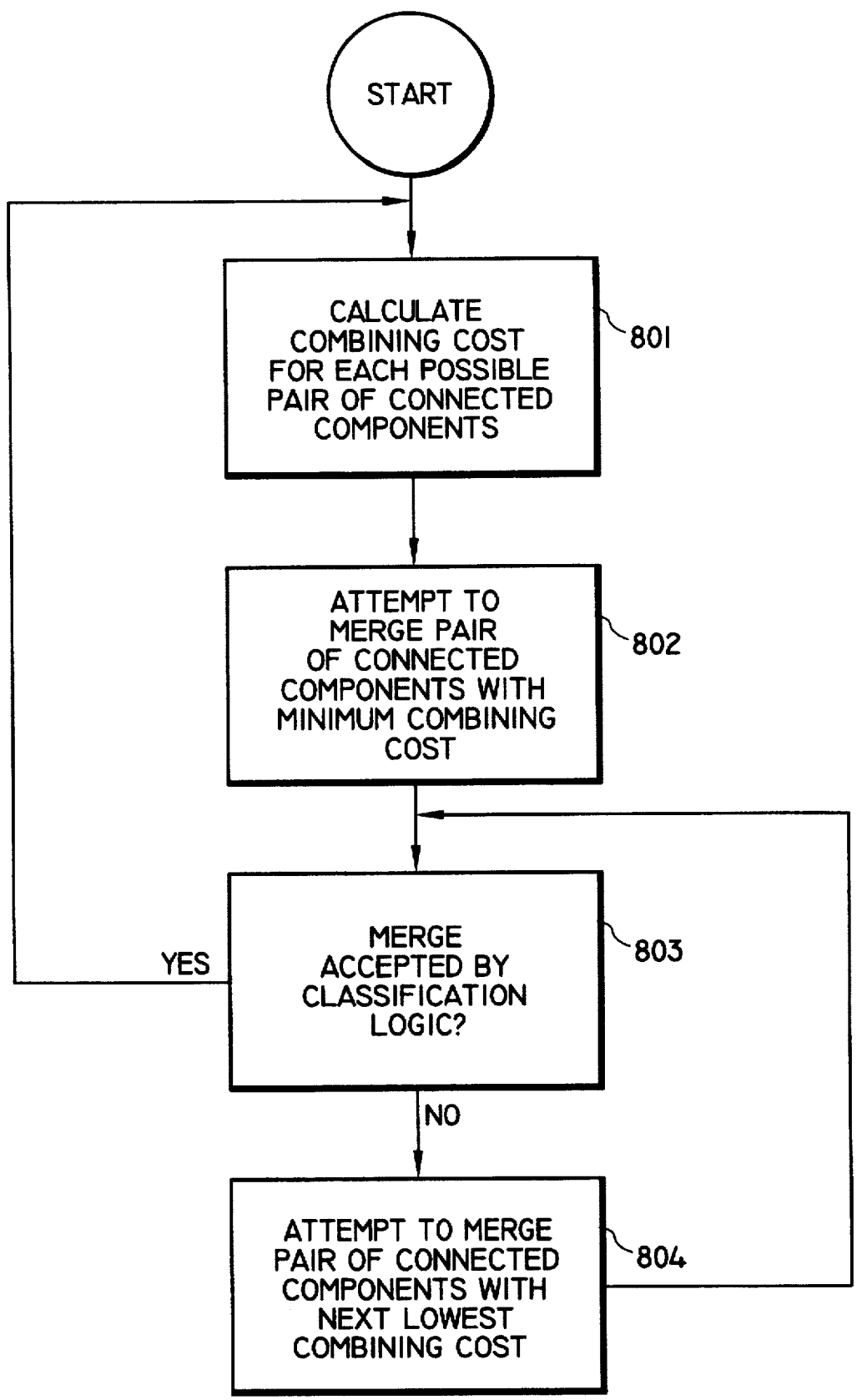

FIG. 8 is a flow diagram showing the operation of the merger.

Figure 1:
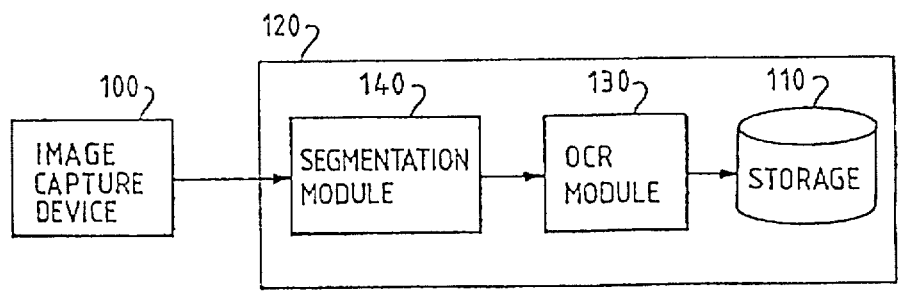
FIG. 1 shows an OCR system.

Referring to FIG. 1, an apparatus for machine reading of printed or handwritten text comprises an image capture device 100 of any suitable conventional type, which may be, for example, an image capture camera or an optical scanner. Such a device generates an electronic signal representative of an image of the markings on a document. This image is digitized and stored in the form of a bi-level image comprising rows and columns of binary pixels in a suitable format in a data storage device 110. The signal from the image capture device 100 is passed to a data processing system 120 which includes data storage device 110, OCR module 130 and segmentation module 140.

In this embodiment, the data processing system is a general purpose computer workstation of conventional type which operates under the control of suitable programs to carry out the image processing and recognition tasks described herein. The computer could be, for example, one of the IBM RISC SYSTEM/6000 family of computers (IBM and RISC SYSTEM/6000 are trade marks of International Business Machines Corporation).

It will be understood, however, that the invention may equally be implemented in the form of hardware using specially designed circuits or using any combination of special or general purpose hardware or software.

OCR module 130 is of conventional type and can employ any one of the many known OCR techniques. The function of the OCR module is to take as input an image in digital form which contains only a single character, to identify the one of a number of characters in a finite character set to which the image most closely corresponds and to associate with the image a digital code corresponding to the character.

Since the apparatus of this embodiment is primarily designed to process handwritten text, the OCR module 130 is of a type which is capable of recognizing handwritten characters.

Segmentation module 140 takes as input an image in digital form which contains one or more handwritten characters. The task of the segmentation module 140 is to generate images which contain only a single character for input to the OCR module 130. In other words, the segmentation module must segment the image into its single character components.

Figure 2:
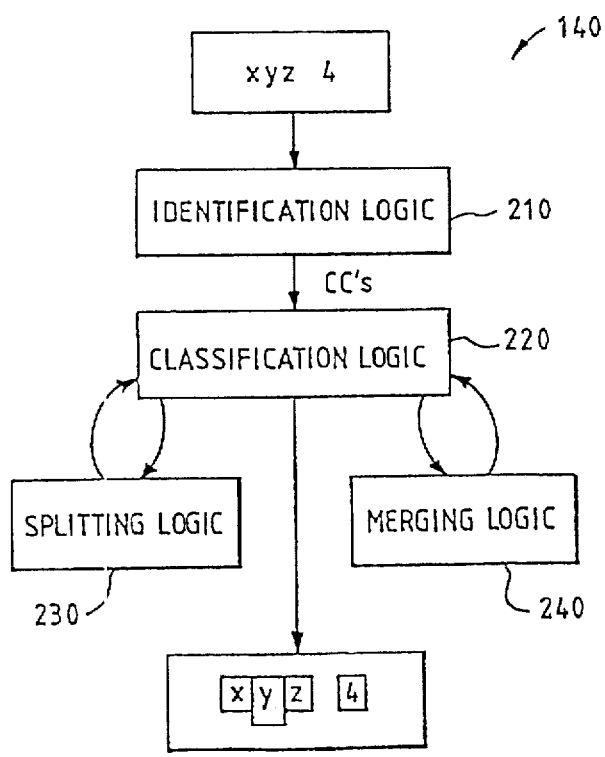
FIG. 2 shows image segmentation apparatus.

FIG. 2 is a general flow diagram which shows the different logical elements which make up the segmentation module 140.

The segmentation module 140 includes four main elements: identification logic 210, classification logic 220, splitter 230 and a merger 240 operating on the connected components of the field. The segmentation of the whole field is carried out by coordinating these elements via a suitable control process.

The four building blocks are as follows:

1. Identification logic 210 takes as input an image of a character field and identifies connected components therein. In this embodiment, the input image is a bi-level image and the connected components consist of connected groups of black pixels. These may be identified and stored in any one of a number of known ways. One way in which this may be achieved is explained below.

2. Classification logic 220 associates each connected component (CC) with an identifier that indicates the type of component. This classifier, called the BOCR (Basic OCR) classifier, comprises a neural network and is used as the controller of the segmentation process.

3. Splitting logic 230 is a character separation hypothesizer that makes hypotheses for separating a CC into two disjoint images. As described in more detail below, the full separation process is controlled by the BOCR, where the CC is separated into its comprising characters in a tree fashion way. At each step, a sub-CC is separated into two components, where the split is either confirmed or rejected by the BOCR.

4. Merging logic 240 is a merging hypothesizer that makes hypotheses regarding merging of two CCs into a single CC. The merging process is carried out progressively based on appropriate cost function such that at each step, the pair of two CCs whose relative "distance" is minimal, over the whole field, are attempted to be merged. The merge hypothesis is then confirmed or rejected by the BOCR classification logic 220.

These components are described in more detail below:

1. The Identification Logic 210

In this embodiment, the image is represented via a run-length-encoding, in which at each image row each run is specified by its starting and ending indices. The connected components of the image are obtained by passing through image rows one by one. At the first row that contains runs, all the runs are indexed, starting with index=1. At each subsequent row, each run is tested. If it is connected, i.e., adjacent, to some run at the preceding row, it is assigned with the index of that run. If not, it is given a new index. If the run is connected to more than one run in the previous row, then, all the indices of these runs are unified into a single index. After scanning all the image rows, the connected components are defined such that each connected component is defined by the collection of all the runs having the same index.

Figure 3:
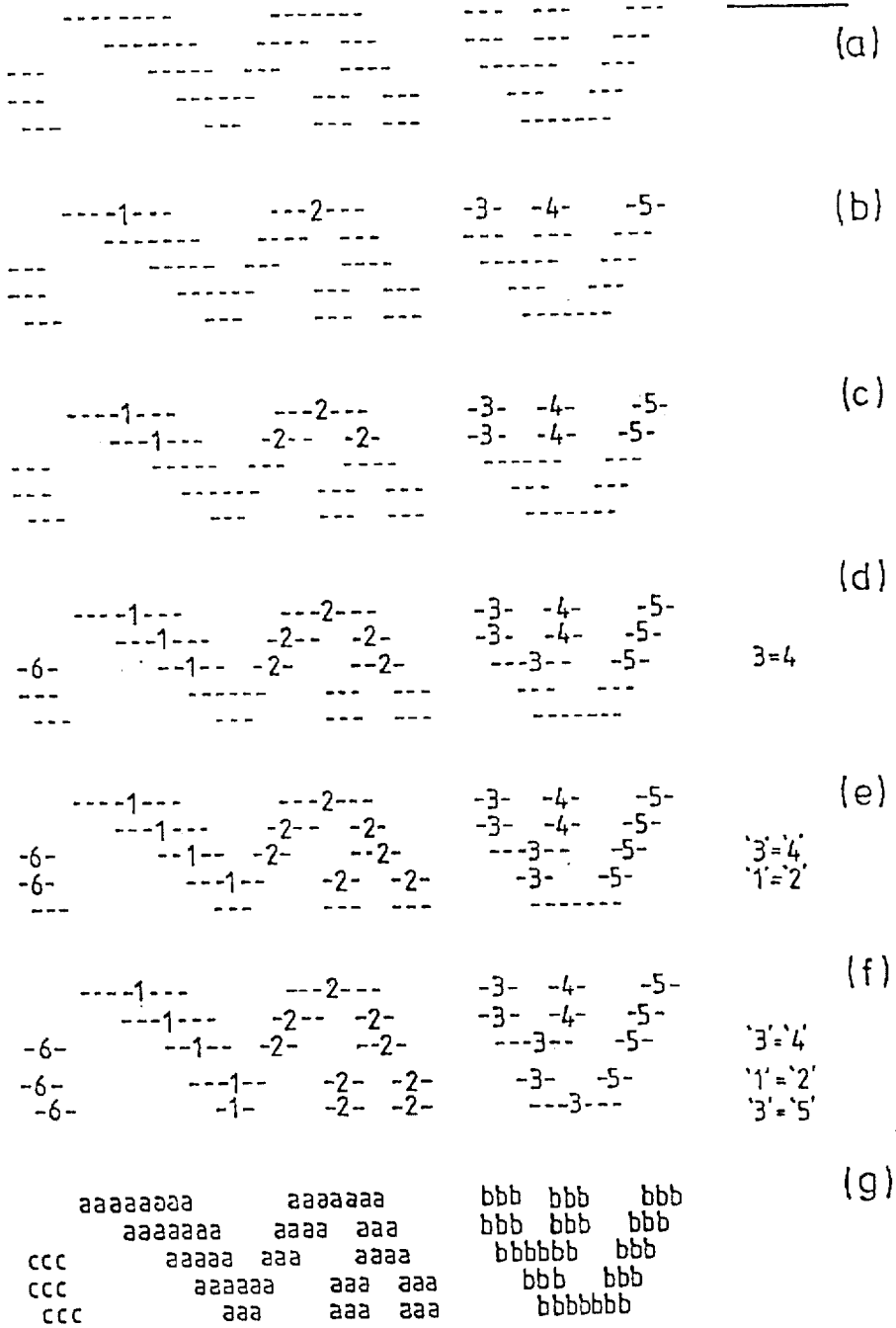

For example, consider the image shown in FIG. 3*a*. Scanning the first row yields the indexing shown in FIG. 3*b*. Scanning the second row yields the indexing as shown in FIG. 3*c*. Scanning the third row creates a new index '6' and reveals the identity between indices '3' and '4' as shown in FIG. 3*d*. Scanning the 4th row reveals the identity between indices '1' and '2' as shown in FIG. 3*e*. Finally, scanning the last row reveals the identity between the indices '3' and '5' as shown in FIG. 3*f*.

Renaming the indices according to the identities found along the process, that is:

'1' & '2'→'a'

'3' & '4' & '5'→'b'

'6'→'c' leaves 3 connected components (CCs) as shown in FIG. 3*g*.

2. The Classification Logic 220

The BOCR classification logic 220 identifies the type of each CC in the context of the field. It also weighs the context of the form in which the field resides, when such context is of value. This contextual information is used for normalization purposes with respect to the size, width, height and the number of pixels of the handwritten characters, pen width, and handwriting style.

The classifier is implemented as the neural network classifier described in E. Yair, A. Gersho "The Boltzmann Perceptron Network—A Soft Classifier" *Journal of Neural Networks*, Vol.3, 203-221, March 1990 [R1], and arranged to process a feature vector comprising measurements of suitable features of the image such as the CC relative size, relative location in the field neighborhood, intersection with horizontal lines, distribution of pixels along vertical and/or horizontal axes.

The Boltzman Perceptron Classifier (BPC) described in R1 is a neural network based classifier which accepts a feature vector x of dimension k at its input and supplies the M output probability values: Pr(m), m=1,..., M, where M is the number of classes, and Pr(m) is the probability that the input vector x belongs to class m. The output probability values satisfy the condition:

$$Pr(1)+Pr(2)+ \ldots +Pr(M)=1.$$

This type of classification is called soft classification because the classifier does not choose a certain class to be associated with the input vector, but rather supplies all the probabilities of the input to be a member of each of the classes. The user of the classifier may use this information to choose the best class as the most probable class.

For example, suppose that it is desired to soft classify each connected component (CC) into two classes: noise and non-noise, and the information on which this classification is based is measured by the following features: the width, the height, and the number of pixels of the CC. Then, the input feature vector is x=(width, height, n_of_pixels) (a 3-dimensional vector) and the output probabilities will be P and 1-P, where P is the probability that the CC is a noise CC, and 1-P is the probability that the CC is a non-noise CC. In other words, the classifier classifies the CC to be a noise component with probability P.

A detailed description of the BPC and its operation and training are given in R1 the contents of which is herein incorporated by reference.

In this embodiment each CC is soft classified by the BOCR classification logic 220 into one of the following 6 basic classes:

1. noise 'n'
2. edge 'e'
3. part of a character 'p'
4. single character 'd'
5. two connected characters '2'
6. three or more connected characters '3' the tags 'n', 'e', 'p', 'd', '2', '3' are the abbreviations used in the following description for these 6 classes.

In principle, a BPC may be used which accepts a feature vector containing a large number of different features of the CC to be classified and supplies the probabilities of classifying the CC into each of the 6 classes of interest.

However, this would not be the most efficient implementation because the set of features required to distinguish between classes such as '2' and 'd' are completely different than those required for the classification between the classes 'n' and 'd'. For example, a feature that measures the CC height is irrelevant for the classification whether the component is 'd' or '2', whereas it is of crucial importance for the classification between 'd' and 'n'.

Thus, measuring all the required features for all the 6 classes and putting them into a single feature vector yields a high dimensional feature space in which the classification task is much harder.

In the preferred embodiment a binary tree implementation is employed as shown in FIG. 4 where each node of the tree is a BPC classifier that carries out a binary classification task, i.e., between two classes, based on features that are specific to the classification task at that node.

Specifically, at the root of the tree, there is a BPC classifier that determines whether the CC is either {'n' or 'e' or 'p'} or {'d' or '2' or '3'}. At the node 'd23' there is a BPC classifier that soft classify the CC into either 'd' or {'2' or '3'} and so on for the other tree nodes.

At each node the BPC of that node accepts a different set of features, that are adequate to the classification task at that node.

The full feature set of the CC contains 27 features as follows:

1. CC width normalized by the nominal CC width;
2. CC height normalized by the nominal CC height;
3. CC height normalized by the height of the field;
4–8. Average number of intersections of the CC image with horizontal lines in 5 regions, uniformly spaced along the vertical axis of the field;
9–11. Average number of interactions of the CC image with horizontal lines in 3 regions, uniformly spaced along the vertical axis of the CC;
12. Number of pixels in the CC normalized by the average number of pixels/CC in the field;
13–15. Percentages of the pixels of the CC that reside on the left, middle & right thirds of the CC;
16–20. CC pixel distribution along the vertical axis of the field, computed in 5 non-overlapping regions of equal size;
21. Overall area of the LERs (Least Enclosing Rectangles) of all the image components that reside above the CC's LER, normalized by the area of the CC's LER;
22. Overall area of the LERs of all the image components that reside below the CC's LER, normalized by the area of the CC's LER;
23. The distance from the center of the CC's LER to the nearest edge of the field along the x-axis, normalized by the field width;
24. The distance from the center of the CC's LER to the nearest edge of the field along the y-axis, normalized by the field height;
25. The area of the least enclosing rectangle (LER) of the CC, normalized by the area of the nominal LER area;
26. The minimal relative number of pels in a quarter of the image (normalized to the range of [0,1]). The image rectangle is divided into 4 sub-rectangles of equal size. In each rectangle the number of pels (normalized to the total image pels) is counted. This feature is the minimal number of pels out of these 4 quarters multiplied by 4.
27. minimal distance to an adjacent CC, whose height is at least half of the field's height.

The feature sets used in each of the five tree nodes are as follows:

| Node | Features |
| --- | --- |
| nepd23 | 2,3,4–8,12,16–20,21,22,27 |
| nep | 1,2,12,25 |
| d23 | 1,4–11,12,13–15,26 |
| ne | 1,2,23,24 |
| 23 | 1,4–11,12 |

Typically, the field being segmented will be included in a certain form or page, such as a tax form, a census form, a Giro slip, etc., and the available data will be the collection of CCs collected from the whole page. If such a page is not available, for example as in the case of a zipcode field on a postal envelope, the available data is the collection of CCs in the zipcode field itself.

Thus, in the preferred embodiment characteristics of the form as a whole are incorporated into the feature vector, e.g. when segmenting fields in a tax form, by carrying out two passes over the form. In the first pass, relevant features from the whole form are accumulated and averaged. These average values are treated as nominal values of the handwritten text of the form, and they are used as normalization factors in the second pass, in which features of each field are extracted, normalized, and are then fed into the classifier for classification.

This two-pass method enables an on-line adaptive learning capability for the classifier about the specific handwriting style of the writer, such as average pen width, nominal distance between characters, character width, height, etc.

The computation of each of the nominal features, i.e., width, height and the number of pixels, is carried out as follows. During the first pass, all the values of each of the features to be normalized are collected into a vector. This vector will be denoted for a given feature by x. The next step is to compute what will be referred to as the 'suppressed outlier average' of x, which is the average of x from which outlier values have been excluded.

This is carried out as follows: The sequence x is sorted in increasing order to yield a sorted sequence s. Values above max_value and below min_value are excluded from s unless this exclusion yields a null sequence. Possible outliers of s are always its two edge elements. The sequence s is chopped by omitting one outlier after the other as long as outliers exist. An outlier value is defined as an edge element of s that is sufficiently far from the sequence mean. The criterion of 'sufficiently far' here means that:

$$(|outlier-mean|/mean) > outlier\_threshold.$$

The outliers are omitted from both sides of s alternately, i.e., each time from a different edge of s, one at a time, and after each such omission the sequence mean is updated.

This omission process is stopped if either the length of the chopped sequence becomes equal to 2, or if none of the two edge elements of s is an outlier. The mean value at that instant is returned as the suppressed outlier average.

Note that if outlier_threshold=0, the suppressed outlier average is the median value of the input sequence x.

From experiment, the following values were found adequate for this averaging task (for a scan resolution of 200–300 dpi).

| feature | min_value | max_value | outlier_threshold |
| --- | --- | --- | --- |
| CC width | 3 | inf. | 0.5 |
| CC height | 3 | inf. | 0.5 |
| CC n_of_pels | 5 | inf. | 0.5 |

Based on the six basic classes, three "higher" classes of CCs are defined and used by the splitter and merger as described below:

Connected CC: a CC that is identified by the BOCR as 'more' than a single character, i.e., two or more connected characters.

Character CC: a CC that is identified by the BOCR as a single character.

Broken CC: a CC that is identified by the BOCR as "less" than a character, in other words as either part of a character, noise or an edge.

The specific implementation of the classifier for the CC types may vary as long as its classification represents meaningful segmental information that can be used for monitoring the other two modules of the segmentation.

It will be understood that the basic BOCR classes may be modified or extended according to the application. For example, it could support only the three "higher" classes, viz connected CCs, character CCs, and broken CCs. Alternatively, in a simple implementation, it may suffice to classify the connected components as either most likely to be a single character or most likely not to be a single character.

3. The Splitter 230

The splitter 230 splits connected CCs into sub components that are the individual characters comprising the connected CC. A connected CC might be a string comprised of any arbitrary number of touching characters.

In the context of field segmentation it is important that the split CC will be "fully" separated. This is, it must be ensured that none of the resulting sub CCs of the splitter will represent a connected CC.

To ensure full separation of connected CCs, the classification logic 220 is used as a controller of the splitter. The split process of a connected CC is shown in FIG. 5 and is carried out by growing a binary tree where the root node is the CC string to be split, and each node in the tree is a sub CC of its parent node. The leaf nodes of the tree are the final separated sub CCs of the root node.

The split is carried out by growing the tree where in each step a single split hypothesis, for a single tree node, is generated. The outcome two children CCs are sent to the BOCR which may accept or reject the split. The split hypothesis is accepted if both children CCs are identified as either single characters or connected CCs. Otherwise, i.e. if at least one of the children CCs is identified by the BOCR as a broken CC, the split hypothesis is rejected. If the split hypothesis is rejected, the node is marked as a leaf node and another hypothesis, for another non-leaf node, is generated and the resulting subimages passed to the BOCR classifier 220 in the same way.

If the hypothesis is accepted, the two new sub CCs are defined as new children nodes of the split node and the two nodes are added to the tree. The process is then repeated for the subimages to determine which of them should be further split. The separation tree grows in an iterative manner until all the leaf nodes represent single-character CCs.

This tree structure split scheme has the advantage that the total number of characters in the split CC need not be known a priori, and the order of the split can be determined dynamically.

4. The Merger 240

Broken CCs are merged by the merger 240. A broken CC may also be merged to a character CC. Two CCs are merged by associating them with a single field segment.

It will be understood that it is not necessary that additional black pixels are added to physically connect them, although this could be performed if desired. In other words, merging can be physical in the sense that the two CCs are physically connected or logical in the sense that the two CCs are considered to be a united entity, as for example with the character "5" whose upper bar might be disconnected from the lower part.

In this embodiment, the merging of CCs is carried out via a cost-based progressive merging method, with an appropriate cost function which measures how likely each pair of two CCs in the field are to be part of the same single character.

Referring Dow to FIG. 8, a flow diagram showing the operation of the merger is shown. Prior to merging, the cost function is evaluated for each possible pair of the CC's in the field to generate a matrix of combining costs (step 801). Then, merging of CCs is carried out progressively so that at each step an attempt is made to merge the pair of CCs which have the minimum combining cost, i.e. having maximal likelihood to be part of the same character (step 802). The merging hypotheses are then raised for CC pairs in increasing cost values, and they are then accepted or rejected by the BOCR.

At each step, the merged image is then reclassified by the classification logic 220 and either approved or disapproved (step 803).

Merge hypotheses are accepted as long as the resulting merged CC is not classified by the BOCR classification logic 220 as "more" than a single character.

If the merge is accepted (step 803), the matrix of combining costs is then recalculated (step 801) and the process repeated for the pair of CC's with the lowest combining cost (step 802). If the merge is not accepted (step 803), then an attempt is made to merge the pair of CC's with the next lowest combining cost and so on (step 804).

This process is repeated until it is not possible to merge the CCs any further and still not have the classification logic classify the merged image as more than a single character.

In this embodiment, when merging broken components, a cost matrix C is computed for all the CC pairs in the field, where the (i,j) entry of this matrix, denoted by $C_{i,j}$ is the likelihood cost of combining CCs i and j. $C_{i,j}$ is a value in the range [0.0,1.0], where a value of 0.0 means very high likelihood for combining the i-th and j-th CCs, and a value of 1.0 means that it is very unlikely that these CCs should be combined.

In this embodiment, $C_{i,j}$ is computed as follows:

1. if none of the CCs (i and j) are 'part of a digit' as determined by the BOCR classifier 220, $CC_{i,j}=1$.

2. Else, let us denote by:
   Ox=the overlap along the horizontal axis between the two LERs (least enclosing rectangles) of the CCs i and j.
   tx=MIN (width_of_LER_i, width_of_LER_j)
   Orx=1.0−Ox/tx
   Orx is equal to 0.0 if the two LERs completely overlap along the horizontal axis, and is equal to 1.0 if they are completely disjoint along this axis.
   Dx=distance along the x-axis between the two components i and j.
   rx=the width of the LER of the two components together.
   wx=nominal distance between two subsequent connected components. wx is computed in the same way as other nominal values, as described above.
   Drx=Dx/(rx+wx), but if Drx>1.0 set Drx=1.0.

The cost is then calculated as follows:

$$cost = a*Orx + b*Drx,$$

where values of: a=0.35 and b=0.65 have been found by the inventors to be acceptable.

It will be understood that any suitable cost function may be used for the merging hypothesizer to assess the "distance" or combining cost of two CCs, as long as these hypotheses are raised progressively, starting from the minimal cost over the whole field, until the merging process is terminated.

5. Control Process

The above building blocks are used to carry out a global segmentation process. First, the identification logic 210 is invoked to tag all the CCs in the box. Then, all the connected CCs are separated using the splitter 230. After all possible splits have been made, the merger is invoked to merge the CC's. When no more merges are left to be carried out, the segmentation is completed.

If there is an external constraint on the number of final segments, as is the case e.g. with postal zipcodes, the merging process can be terminated by the external constraints, i.e., upon creating the necessary number of segments, rather than by the classification logic 220.

FIGS. 6a–e show examples of handwritten data fields:

In FIG. 6a the field contains 7 components.

In FIG. 6b the field contains many components.

In FIG. 6c the field has only three components (including a CC with three touching characters).

In FIG. 6d characters are both broken and combined into 9 components in the field.

FIG. 6e contains two pairs of strongly touching characters.

Segmentation results for the data fields given in FIGS. 6a–e are shown in FIGS. 7a–e.

I claim:

1. Image processing apparatus for segmenting an input image into image portions each containing a single character, the apparatus comprising:

identification logic for identifying connected components in the input image;

classification logic for determining into which of a number of predefined classes a connected component falls, wherein at least one of said classes indicating that the connected component is most likely to be a single character, at least one of the classes indicating that the connected component is most likely to be less than a single character, and at least one of said classes indicating that the connected component is most likely to be more than a single character; and merging logic and splitting logic for merging and splitting the connected components, respectively, the merging and splitting logic and the classification logic being arranged to operate so that the connected components are iteratively merged and/or split and the resulting split and/or merged connected components are reclassified by the classification logic until an image segmentation is achieved which meets a predefined criterion, wherein the merging logic performs the merging of the connected components by first evaluating a pre-determined cost function to calculate a combining cost value for each possible pair of connected components in a field, and then attempting to merge the pairs of connected components progressively with increasing combining cost values, commencing with the pair of connected components having a minimum combining cost value, until one of the attempted merges is accepted by the classification logic; the merging process being continuously repeated after each acceptance of an attempted merge by the classification logic by evaluating the predetermined cost function to calculate a combining cost value for each of the possible remaining pairs of connected components.

2. Apparatus as claimed in claim 1 wherein the classification logic comprises means to derive a feature vector from the connected components via a two-pass process in which features of a document image in which the image is located are used to normalize the feature values.

3. Apparatus as claimed in claim 1 wherein the splitting logic is arranged to operate before the merging logic.

4. Image processing apparatus for segmenting an input image into image portions each containing a single character, the apparatus comprising:

identification logic for identifying connected components in the input image;

classification logic for determining into which of a number of predefined classes a connected component falls, at least one of said classes indicating that the connected component is most likely to be a single character, wherein the classification logic comprises a neural network; and merging logic and splitting logic for merging and splitting the connected components, respectively, the merging and splitting logic and the classification logic being arranged to operate so that the connected components are iteratively merged and/or split and the resulting split and/or merged connected components are reclassified by the classification logic until an image segmentation is achieved which meets a predefined criterion, wherein the merging logic performs the merging of the connected components by first evaluating a pre-determined cost function to calculate a combining cost value for each possible pair of connected components in a field, and then attempting to merge the pairs of connected components, progressively, with increasing combining cost values, commencing with the pair of connected components having a minimum combining cost value, until one of the attempted merges is accepted by the classification logic; the merging process being continuously repeated after each acceptance of an attempted merge by the classification logic by evaluating the predetermined cost function to calculate a combining cost value for each of the possible remaining pairs of connected components.

5. Apparatus as claimed in claim 4 wherein the classification logic comprises means to derive a feature vector from the connected components via a two-pass process in which features of a document image in which the image is located are used to normalize the feature values.

6. Apparatus as claimed in claim 4 wherein the splitting logic is arranged to operate before the merging logic.

7. Image processing apparatus for segmenting an input image into image portions each containing a single character, the apparatus comprising:

identification logic for identifying connected components in the input image;

classification logic for determining into which of a number of predefined classes a connected component falls, at least one of said classes indicating that the connected component is most likely to be a single character, wherein the classification logic has a tree structure comprising partial classifiers at each node; and merging logic and splitting logic for merging and splitting the connected components, respectively, the merging and splitting logic and the classification logic being arranged to operate so that the connected components are iteratively merged and/or split and the resulting split and/or merged connected components are reclassified by the classification logic until an image segmentation is achieved which meets a predefined criterion, wherein the merging logic performs the merging of the connected components by first evaluating a pre-determined cost function to calculate a combining cost value for each possible pair of connected components in a field, and then attempting to merge the pairs of connected components progressively with increasing combining cost values, commencing with the pair of connected components having a minimum combining cost value, until one of the attempted merges is accepted by the classification logic; the merging process being continuously repeated after each acceptance of an attempted merge by the classification logic by evaluating the predetermined cost function to calculate a combining cost value far each of the possible remaining pairs of connected components.

8. Apparatus as claimed in claim 7 wherein the classification logic comprises means to derive a feature vector from the connected components via a two-pass process in which features of a document image in which the image is located are used to normalize the feature values.

9. Apparatus as claimed in claim 7 wherein the splitting logic is arranged to operate before the merging logic.

10. Image processing apparatus for segmenting an input image into image portions each containing a single character, the apparatus comprising:

identification logic for identifying connected components in the input image;

classification logic for determining into which of a number of predefined classes a connected component falls, at least one of said classes indicating that the connected component is most likely to be a single character; and merging logic and splitting logic for merging and splitting the connected components, respectively, the merging and splitting and the classification logic being arranged to operate so that the connected components are iteratively merged and/or split and the resulting split and/or merged connected components are reclassified by the classification logic until an image segmentation is achieved which meets a predefined criterion, wherein the splitting logic is arranged to generate a tree structure by postulating a single split hypothesis for each connected component, the images generated by the split hypothesis being processed by the classification logic to accept or reject the split and if the split is accepted being added to the tree as children nodes and processed by the splitting logic in the same way until no further splitting is possible, and wherein the merging logic performs the merging of the connected components by first evaluating a pre-determined cost function to calculate a combining cost value for each possible pair of connected components in a field, and then attempting to merge the pairs of connected components progressively with increasing combining cost values, commencing with the pair of connected components having a minimum combining cost value, until one of the attempted merges is accepted by the classification logic; the merging process being continuously repeated after each acceptance of an attempted merge by the classification logic by evaluating the predetermined cost function to calculate a combining cost value for each of the possible remaining pairs of connected components.

11. Apparatus as claimed in claim 10 wherein the classification logic comprises means to derive a feature vector from the connected components via a two-pass process in which features of a document image in which the image is located are used to normalize the feature values.

12. Apparatus as claimed in claim 10 wherein the splitting logic is arranged to operate before the merging logic.

13. Image processing apparatus for segmenting an input image into image portions each containing a single character, the apparatus comprising:

identification logic for identifying connected components in the input image;

classification logic for determining into which of a number of predefined classes a connected component falls, at least one of said classes indicating that the connected component is most likely to be a single character; and merging logic and splitting logic for merging and splitting the connected components, respectively, the merging and splitting logic and the classification logic being arranged to operate so that the connected components are iteratively merged and/or split and the resulting split and/or merged connected components are reclassified by the classification logic until an image segmentation is achieved which meets a predefined criterion, wherein the merging logic performs the merging of the connected components by first evaluating a pre-determined cost function to generate a matrix of combining cost for each possible pair of connected components in a field, and then attempting to merge the pairs of connected components, progressively, with increasing combining cost values, commencing with the pair of connected components having a minimum combining cost value, the images generated by the combination being processed by the classification logic to accept or reject the combination until one of the attempted merges is accepted by the classification logic; the merging process being continuously repeated after each acceptance of an attempted merge by the classification logic by evaluating the predetermined cost function to calculate a combining cost value for each of the possible remaining pairs of connected components, and to repeat the process until a stopping criterion is satisfied.

14. Apparatus as claimed in claim 13 wherein the classification logic comprises means to derive a feature vector from the connected components via a two-pass process in which features of a document image in which the image is located are used to normalize the feature values.

15. Apparatus as claimed in claim 13 wherein the splitting logic is arranged to operate before the merging logic.

\* \* \* \* \*